July 30, 1940.  E. RIETSCH  2,209,932
RESISTANCE LINE WELDING CONTROL
Filed Dec. 12, 1938
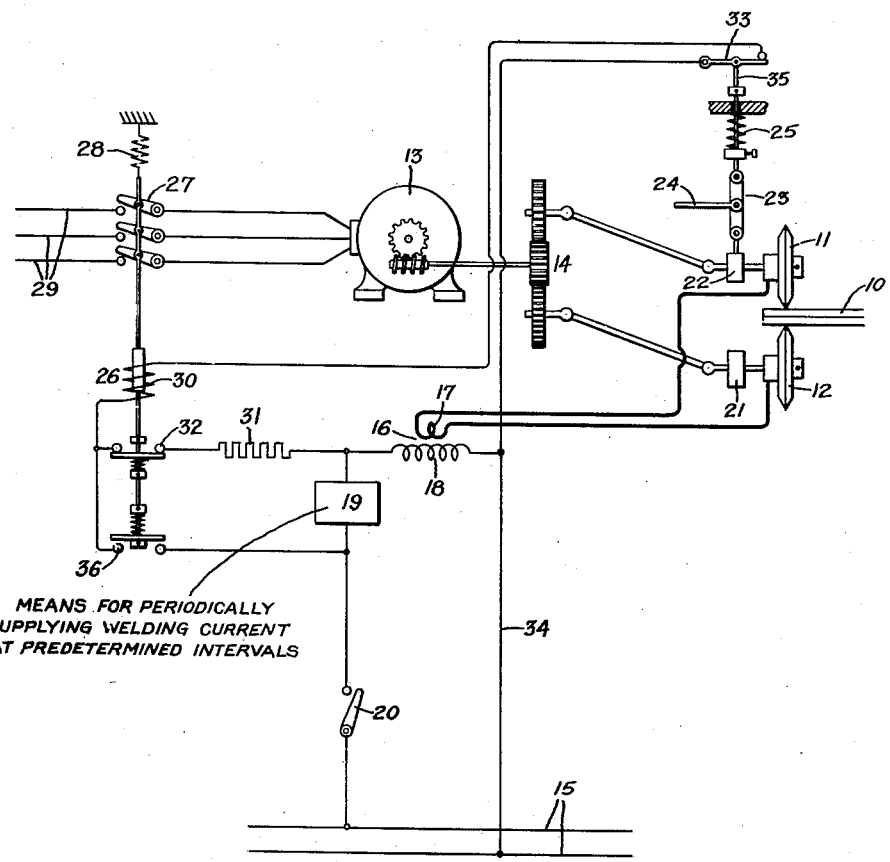
Inventor:
Eberhard Rietsch,
by Harry E. Dunham
His Attorney.

Patented July 30, 1940

2,209,932

UNITED STATES PATENT OFFICE 2,209,932

RESISTANCE LINE WELDING CONTROL

Eberhard Rietsch, Berlin-Konradshohe, Germany, assignor to General Electric Company, a corporation of New York Application December 12, 1938, Serial No. 245,264
In Germany December 24, 1937

3 Claims. (Cl. 219—4)

By periodically supplying welding current to the electrodes of a resistance line welding machine, it is possible to form a seam made up of a plurality of spaced welds. Unless the first weld in such a seam is properly located, the resulting assembly is very frequently unsatisfactory. For example, in joining two sheets, if the first weld is not located at the edge of the sheets, they are liable to split open at that point thereby forming an unsatisfactory assembly. Likewise, in manufacturing certain pressure vessels formed by welding sheets together, unless the first weld in the seam is properly located, the resulting assembly is subject to pressure deformations which render the vessel unsuited for its intended purpose. Many other examples could be given of assemblies wherein it is necessary properly to locate the first weld of a seam made up of a plurality of spaced welds.

Where the welds in a seam are spaced from one another by substantial distances, it is not possible to locate properly the first weld by simultaneously initiating the relative movement between the electrodes and the work with the connection of a source of periodic welding current to the electrodes since the first application of welding current to the electrodes from such source may not occur until after the electrodes have moved relative to the work a predetermined distance.

If, however, the electrodes are properly located on the work and the relative movement between these electrodes and the work is not initiated until after the first application of welding current to them, the first weld in the seam may be properly located.

It is consequently an object of my invention to initiate and maintain the traversing motion between the welding electrodes and the work in response to the first application of welding current to the electrodes from a source of welding current that periodically varies between a welding value and a non-welding value.

More specifically, it is an object of my invention to provide a control for resistance line welding machines which periodically supplies welding current to the electrodes and initiates and maintains a relative movement between the electrodes and the work to be welded in response to the first application of welding current to the electrodes.

My invention will be understood from the following description taken in connection with the accompanying drawing which diagrammatically illustrates one embodiment thereof.

In the arrangement illustrated in the drawing, welding current and pressure are applied to the work 10 by means of electrodes 11 and 12. These electrodes and the work are traversed relative to one another by imparting rotation to the electrodes through the agency of a motor 13 connected with them through a transmission 14. Welding current is supplied to these electrodes from a source of supply 15 through a welding transformer 16. The secondary 17 of this transformer is connected to the electrodes and the primary 18 of this transformer is connected to the source of supply 15 through a controlling device 19 and a switch 20. The controlling device 19 may be a mechanical or electronic switching means, a modulator, or a similar device which periodically energizes the transformer 16 from the source of supply 15 and consequently periodically supplies welding current at predetermined intervals to the electrodes 11 and 12.

In the arrangement illustrated, a welding pressure is exerted on the work by moving one electrode relative to the other. The electrode 12 is supported in a fixed bearing 21 and the electrode 11 is supported in a bearing 22 which is movable toward and away from bearing 21 through the agency of a toggle 23 under the control of an operating lever 24. The desired electrode pressure is obtained by adjusting a spring 25 against which the toggle 23 works in forcing the electrode 11 toward the electrode 12.

The operation of the electrode motor 13 is initiated and maintained through the agency of control circuits embodying a relay 26. When energized, this relay closes a switch 27 against the bias of the spring 28 to connect the motor to a source of supply 29. The operating coil 30 of this relay is initially energized from the source of supply 15 through switch 20, controlling device 19, resistance 31, energizing contacts 32 of the relay, a switch 33 and conductor 34. The switch 33 is closed after a predetermined welding pressure has been applied to the work by the electrodes 11 and 12. For example, the movable member of the switch 33 may be actuated by a member 35 associated with the toggle 23 and spring 25, the arrangement being such that upon a predetermined compression of the spring 25, the switch 33 is closed. Once the relay 26 has been energized through the control circuit above traced, it is maintained energized through another control circuit from the source of supply 15 through switch 20, holding contacts 36 of relay 26, switch 33 and conductor 34. During the transition from the energizing circuit to the holding circuit, the controlling device 19 may be momentarily shunted by the simultaneous closure of energizing contacts 32 and holding contacts 36 of relay 26, and the resistance 31 is employed for limiting the flow of current in this shunt connection about the controlling device 19.

The operation of the system above described is believed to be apparent. Briefly it is as follows: The controlling device 19 periodically energizes the welding transformer 16 to vary the current supplied to the electrodes between a welding and non-welding value. Thus, when the switch 33 in the control circuits of the operating coil 30 of relay 26 has been closed upon the attainment of a desired welding pressure between the electrodes and the work the first energization of the welding transformer 16 by the controlling device 19 also energizes the relay 26 causing it to complete the connection of the electrode motor 13 to the source of supply 29 through the closure of switch 27 which is operated by the relay. After the relay 26 is operated, it is maintained energized through its holding contacts 36 until at the termination of the welding operation the switch 20 is opened to deenergize not only the welding transformer but also the electrode motor 13 through the simultaneous deenergization and opening of relay 26. The system disclosed, consequently, functions in a manner to initiate and maintain relative movement between the electrodes and the work upon the first application of welding current to the electrodes from a source of periodic welding current whose period is determined by the operation of the controlling device 19.

As pointed out above, the controlling device 19 may be a periodic switching device, a modulator or the like, and in conjunction with a source of supply 15 functions as a means for periodically supplying welding current to the electrodes at predetermined adjustable intervals. The arrangement for initiating and maintaining relative movement between the electrodes and the work may be variously modified. For example, instead of using the gear driven transmission illustrated which necessitates that the motor be energized and deenergized, the motor may be continuously energized and mechanically connected to the electrodes through the agency of a clutch which is controlled by the relay 26. If the clutch is an electromagnetic clutch, its operating winding may be energized through a switch corresponding to the switch 27 in the system above described. Furthermore, my invention is applicable to those welding machines in which relative movements between the electrodes and the work is obtained by hydraulic means in which case the relay 26 would control the hydraulic means. If the inertia of moving parts is considerable it is desirable to use one of these alternative means rather than the means particularly illustrated and described so that the spacing between the first weld and subsequent welds of the seam is more uniform.

It is of course apparent that the control circuit illustrated and described above may be variously modified and still come within the spirit and scope of my invention which in its broadest aspects merely requires that the traversing motion be initiated and maintained in response to the first application of welding current to the electrodes from a source of welding current that periodically varies between a welding value and a non-welding value.

Consequently, while I have shown but one embodiment of my invention, it is to be understood that my invention is not limited to the particular arrangement illustrated and described and that changes may be made without departing from the spirit and scope thereof.

What I claim as new and desire to secure by Letters Patent of the United States, is:

1. Resistance line welding apparatus comprising an electrode, means for periodically supplying welding current to said electrode at predetermined intervals, means for applying a predetermined welding pressure between said electrode and the work to be welded, and means responsive to the first application of welding current to said electrode after the attainment of said predetermined welding pressure for initiating and maintaining relative movement between said electrode and the work to be welded.

2. Line welding apparatus comprising an electrode, means for applying a predetermined welding pressure to said electrode, means for periodically supplying welding current to said electrode at predetermined intervals, means for traversing said electrode and the work to be welded relative to one another, a control circuit energized in response to the first application of welding current to said electrode, a relay having its operating winding in said control circuit, means including said relay for energizing and maintaining the energization of said traversing means, a switch in said control circuit, and means responsive to the application of a predetermined welding pressure to said electrode for closing said switch.

3. Line welding apparatus comprising an electrode, means for applying a predetermined welding pressure to said electrode, a source of supply, means connected between said source of supply and said electrode for periodically supplying welding current at predetermined intervals to said electrode, a control circuit energized from said source of supply through said means for periodically supplying welding current to said electrode, a second control circuit energized from said source of supply independently of said means for periodically supplying welding current to said electrode, a relay having an operating winding, energizing contacts, and holding contacts, said energizing contacts being connected in said first-mentioned control circuit and said holding contacts being connected in said second-mentioned control circuit, a current limiting resistance connected through said energizing contacts and said holding contacts of said relay in shunt to said means for periodically supplying welding current, a switch in said first-mentioned control circuit and said second-mentioned control circuit, and means responsive to the application of a predetermined welding pressure to said electrode for closing said switch.

EBERHARD RIETSCH.